United States Patent [19]

Burton et al.

[11] 4,077,933

[45] Mar. 7, 1978

[54] PROCESS FOR PREPARING A SULFONATED AND PASSIVATED LOW UNSATURATION ELASTOMER CEMENT

[75] Inventors: Gilbert W. Burton, Mountainside; Charles P. O'Farrell, Clark, both of N.J.

[73] Assignee: Exxon Research & Engineering Co., Linden, N.J.

[21] Appl. No.: 729,415

[22] Filed: Oct. 4, 1976

Related U.S. Application Data

[63] Continuation of Ser. No. 592,461, Jul. 2, 1975, Pat. No. 4,007,149.

[51] Int. Cl.$^2$ .............................................. C08L 9/10
[52] U.S. Cl. .................... 260/29.7 EM; 260/29.7 AT; 260/29.7 B; 260/29.7 T
[58] Field of Search .............. 260/29.7 EM, 29.7 AT, 260/29.7 B, 29.7 T, 79.3 R, 79.3 MU, 33.6 A, 33.6 AQ

[56] References Cited

U.S. PATENT DOCUMENTS

| | | | |
|---|---|---|---|
| 3,444,121 | 5/1969 | Altien et al. | 260/29.7 T |
| 3,503,917 | 3/1970 | Burke | 260/29.7 R |
| 3,642,728 | 2/1972 | Canten | 260/823 |
| 3,836,511 | 9/1974 | O'Farrell | 260/79.3 R |
| 3,912,683 | 10/1975 | O'Farrell | 260/29.7 B |

*Primary Examiner*—M. J. Welsh
*Attorney, Agent, or Firm*—John J. Mahon

[57] ABSTRACT

Sulfonated ionomers of low unsaturation polymers in latex form are prepared in an improved process comprising sulfonating a butyl rubber or EPDM elastomer cement with an acyl sulfate, passivating the sulfonated cement with an organic epoxide, such as propylene oxide, and emulsifying the product in water with an anionic emulsifying agent.

13 Claims, No Drawings

PROCESS FOR PREPARING A SULFONATED AND PASSIVATED LOW UNSATURATION ELASTOMER CEMENT

This is a continuation of application Ser. No. 592,461, filed July 2, 1975, now U.S. Pat. No. 4,007,149, issued Feb. 8, 1977.

BACKGROUND OF THE INVENTION

This invention relates to a method for producing aqueous emulsions and latices of sulfonated low unsaturation elastomers. More particularly, the invention relates to an improvement in carrying out the passivation or quenching of the elastomer cement sulfonation reaction in order to produce a more readily emulsifiable product and provide a more efficient overall latex process.

Sulfonated ionomers of butyl rubber and ethylene-propylene-diene terpolymers are known and are described, for example, in U.S. Pat. No. 3,642,728, issued Feb. 15, 1972 to Canter.

Latices prepared from sulfonated butyl rubber are disclosed in U.S. Pat. No. 3,770,682 issued Nov. 6, 1973 to Hubbard et al wherein the acid form of the sulfonated butyl rubber is emulsified using a nonionic surfactant. O'Farrell, U.S. application Ser. No. 487,907, filed July 12, 1974, now U.S. Pat. No. 3,912,683 issued Oct. 14, 1975, also relates to sulfonated butyl rubber latices and deals with the emulsification of neutralized sulfonated butyl rubber with an anionic surfactant. O'Farrell et al., in U.S. Pat. No. 3,836,511 issued Sept. 17, 1974 and in U.S. application Ser. No. 510,392, deal with the acyl sulfate sulfonation of these elastomers.

In the aforesaid techniques for preparing sulfonated elastomeric latices, substantial quantities of alcohol, such as n-propanol, have been required to quench or passivate the sulfonation reaction. This passivation step is essential in order to provide an emulsifiable product which can be further processed to give an acceptable latex. The amount of such alcohols used has been on the order of 20–40% by weight based on the weight of the sulfonated elastomer cement. After removing solvent, alcohol and excess water from the initial latex to form the final latex, the presence of these quantities of alcohol requires extensive distillation and purification procedures in order to separate the solvent, alcohol and water. When alchols, such a 1-octanol, having boiling points sufficiently high, such that they are not removed during solvent stripping and concentration of the latex, have been used, these alcohols remain as components of the finished latex and cause excessive coagulation and other instability problems in the finished product.

Another disadvantage with respect to the use of an alcohol quenching agent has been the requirement that fairly substantial amounts of emulsifier, such as 10 to 15 parts per hundred (phr), be used per hundred parts of sulfonated elastomer present in the cement. It is known that alcohols can have an adverse effect on the surfactant properties of anionic emulsifiers.

SUMMARY OF THE INVENTION

In the present invention, the numerous disadvantages resulting from the use of an alcohol passivating system for the sulfonation reaction are overcome by employing an organic epoxide containing at least one reactive oxirane functional group. The epoxide may be used in stoichiometric amounts to passivate or quench the sulfonation reaction.

In accordance with the present invention, there has been discovered a process for preparing latices of sulfonated low unsaturation elastomers, such as sulfonated butyl rubber and sulfonated EPDM elastomers, which comprises the steps of:

(a) providing a cement of the elastomer in a volatile hydrocarbon solvent;

(b) sulfonating the elastomer cement with an acyl sulfate sulfonating agent;

(c) passivating the sulfonated cement with a stoichiometric amount of an organic epoxide having at least one reactive oxirane group, that is one

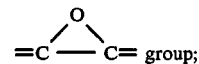

(d) providing an emulsion of the product in water in neutralized form using an anionic surfactant emulsifying agent, said product being neutralized before or after emulsification using a weak base; and (e) thereafter stripping off excess water and solvent, whereby a stable latex emulsion is obtained.

A further embodiment of the present invention resides in a stable latex emulsion composition prepared according to the above-described process.

DETAILED DESCRIPTION OF THE INVENTION

The term "butyl rubber" as used in the specification and claims means copolymers of isoolefins and conjugated dienes which comprises about 0.5 to about 15 mole % conjugated diene and about 85–99.5% isoolefin. Illustrative examples of isoolefins which may be used in the preparation of butyl rubber are isobutylene, 2-methyl-1-propene, 3-methyl-1-butene, 4-methyl-1-pentene and beta-pinene. Examples of conjugated dienes are isoprene, butadiene, 2,3-dimethyl butadiene, chloroprene, piperylene, 2,5-dimethylhexa-2,4-diene, cyclopentadiene, cyclohexadiene and methylcyclopentadiene. The preparation of butyl rubber is described in U.S. Pat. No. 2,356,128 as well as in an article by R. M. Thomas et al. in "Industrial and Engineering Chemistry", Vol. 32, p. 1283, October, 1940.

The term "EPDM" is used in the sense of its definition as found in ASTM-D-1418-64 and is intended to mean a terpolymer containing ethylene and propylene in the backbone and a diene in the side chain. Illustrative methods for producing these terpolymers are found in U.S. Pat. No. 3,280,082, British Pat. No. 1,030,289 and French Pat. No. 1,386,600, which are incorporated herein by reference. The preferred polymers contain about 45 to about 80 wt. percent ethylene and about 2 to about 10 wt. percent of a diene monomer, the balance of the polymer being propylene. The diene monomer is preferably a nonconjugated diene.

Illustrative of these nonconjugated diene monomers which may be used in the terpolymer (EPDM) are hexadiene, dicyclopentadiene, ethylidene norbornene, methylene norbornene, propylidene norbornene, and methyl tetrahydroindene. A typical EPDM is a polymer having a Mooney viscosity at 212° F. of about 90 prepared from a monomer blend having an ethylene content of about 56 wt. percent and a nonconjugated diene content of about 2.6 wt. percent.

The term "cement" as used in the specification and claims means the viscous solution of butyl rubber or EPDM polymer in a suitable volatile organic solvent, preferably the solvent is an aromatic hydrocarbon solvent. The sulfonated cement normally has a Brookfield viscosity of about 3,000 to 10,000 cps. (12 rpm; 24° C.). This cement viscosity prior to sulfonation is preferably 3,000 cps. to 6,000 cps., such as 4,000 cps.

The cement is first prepared by dissolving the butyl rubber or EPDM in a suitable aliphatic or aromatic hydrocarbon or chlorinated hydrocarbon solvent such as hexane, heptane, cyclohexane, dichloroethane, methylene chloride, carbon tetrachloride, toluene, benzene, xylene and the like. Toluene is particularly suitable. Generally speaking the solvent should have a boiling point not greater than about 125° C. and preferably has a boiling point less than the boiling point of water or is capable of forming an azeotrope, the azeotrope having a boiling point less than that of water, to facilitate solvent stripping during preparation of the latex in finished form. The initial concentration of the butyl rubber or EPDM polymer in solution is generally in the range of about 5 to 50% by weight, preferably about 7 to 18% by weight.

In the practice of the present invention, sulfonation of the cement solution is carried out using an acyl sulfate sulfonating agent. Suitable sulfonating agents include acetyl sulfate, propionyl sulfate or butyryl sulfate, with acetyl sulfate being particularly preferred. The acyl sulfate sulfonating agents for use in accordance with the present invention are prepared by reacting the anhydride of a mono-basic acid with sulfuric acid or reacting the mono-basic organic acid with $SO_3$. Sulfonation of unsaturated elastomers generally is described by O'Farrell et al. in U.S. Pat. No. 3,836,511.

The acyl sulfate may be prepared for use in solution but is preferably prepared neat, that is, in the absence of solvent, by the addition of concentrated sulfuric acid to the corresponding anhydride. Acyl sulfates may be formed at about −100° C. to +50° C., more preferably −40 to +30° C., such as about 20° C. Preferably the acyl sulfate is prepared immediately prior to use. In situ preparation is adequate, such as by adding anhydride to the polymer solution and thereafter adding sulfuric acid. When the acyl sulfate is prepared in the solvent prior to use, its solvent concentration should be about 0.5 to 25 wt. %, more preferably 1 to 20%, most preferably 10 to 20%, such as 18% by weight.

Sulfonation of the butyl rubber or EPDM cement may be carried out at any suitable temperature, for example, −100° to as high as 100° C. Pressure is not a critical condition and may be adjusted to any satisfactory level. For instance, the sulfonation may be carried out from a reduced pressure of, say, about 0.5 atmospheres up to a super atmospheric pressure in the area of 10 atmospheres and above. The most suitable conditions from an economic standpoint are temperatures of 15° to 40° C. and a pressure approximating atmospheric pressure. The sulfonation time will vary with the particular conditions selected, the polymer being sulfonated and the degree of sulfonation desired. Generally, the sulfonation reaction is complete within a few seconds to several hours after the reactants are contacted with each other. When sulfonating at approximately room temperature and atmospheric pressure, the contact time should be about 5 seconds to about 25 to 30 minutes.

The level of sulfonation in the polymers of this invention may vary from about 0.08 mole % to about 15 mole %. Preferably the degree of sulfonation is about 0.08 to about 10 mole %, more preferably about 0.1 to about 8 mole %, most preferably about 0.2 to about 8 mole %.

After carrying out the sulfonation reaction, the sulfonated cement is then passivated or quenched with an organic epoxide containing at least one reactive oxirane group. Organic epoxide compounds generally are suitable for use in the practice of the present invention provided they contain at least one such oxirane group capable of reacting with the —$SO_3H$ moiety. Suitable epoxides include aliphatic, cycloaliphatic and aromatic epoxides. These epoxides may contain other substituent functional groups such as an ester group, an unsaturated linkage or a chlorine substituent and similar substituent groups which will not adversely affect the quenching process. Generally speaking the suitable epoxides will have carbon atom range of from about 2 to 20 carbon atoms. Of particular utility in the practice of the present invention are epoxides having 2 to 8 carbon atoms such as ethylene oxide, propylene oxide, 1,2-epoxybutane and the like. Examples of other suitable epoxides are 3,4-epoxy-1-butene; 1,2,3,4-diepoxybutane; 1,2-epoxycyclohexane; 1,2-epoxycyclopentane; 1,2-epoxy-2-methylpropane; 1-chloro-2,3-epoxypropane, ethyl 2,3-epoxybutyrate; 1-allyloxy-2,3-epoxypropane; 2,3-epoxypropyl methacrylate; 1,2-epoxyethylbenzene (styrene oxide); alpha-methylstyrene oxide; and similar oxirane containing compounds.

The epoxide may be conveniently added in admixture with the same solvent which was used in the preparation of the elastomers of that cement such as a mixture of propylene oxide and toluene, the propylene oxide concentration being about 20 to 30% by weight. In the practice of the present invention, the epoxide is employed in at least stoichiometric amounts to effect the passivation, that is, on an equimolar basis based on the moles of reactive oxirane groups present relative to the moles of sulfonating agent employed. Generally speaking, the molar ratio of epoxide, based on the moles of oxirane groups, to sulfonated elastomer is from about 1:1 to 10:1. Thus only relatively small quantities of epoxide are required in order to effect the passivation of the sulfonation reaction.

In the next step of the process, the sulfonated and passivated low unsaturation elastomer is then emulsified into water in a neutralized form. The neutralization step may be carried out before or after emulsion preparation. Generally, it is preferred to emulsify the product first and thereafter carry out neutalization.

As neutralizing agents are employed weak bases such as an organic amine or ammonium hydroxide. Particularly useful are the lower alkyl primary amines and aromatic primary amines, such as ethylamine, propylamine, butylamine, phenylamine, and the like. Other substituted organic amines including secondary and tertiary amines are also useful. Exemplary neutralizing agents are diethylamine, triethylamine and others containing substituent groups such as hydroxyl, chloro, carbonyl, ether, thioether, nitroso and the like. The term "weak base" as used herein applies to ammonium hydroxide and organic amines having a $pK_b$ greater than 3.0.

The finished latex may be subsequently treated with a strong base, such as an alkali metal or alkaline earth metal hydroxide in order to increase the ionic bonding of the film cast from the latex. The term "strong base" is meant to refer to metal compounds and organic amines having a $pK_b$ value of less than 3.0. Exemplary are sodium, potassium, barium and calcium hydroxides, alkoxides, carbonates or amine compounds such as tetraorgano ammonium hydroxide, tetramethyl ammonium hydroxide or trimethyl benzyl ammonium hydroxide.

Latex emulsions are prepared by combining approximately equal quantities of the passivated cement, either in neutralized or non-neutralized form, with water containing a suitable quantity of a surfactant or emulsifying agent. An advantage of the present invention is that significantly reduced quantities of emulsifying agent are effective in preparing stable oil-in-water emulsions. Heretofore, in preparing latex emulsions from alcohol quenched sulfonated elastomer cements, the amount of emulsifier required was on the order of 10 to 15 parts per hundred parts of elastomer present in the sulfonated cement solution. In the present invention, effective emulsification and dispersion is achieved by employing approximately 3 to 6 parts per hundred of anionic surfactant per hundred parts of elastomer present in the cement solution.

Anionic emulsifying agents are employed in preparing the emulsion compositions of the present invention. Particularly preferred are the sodium, potassium and ammonium salts of sulfated ethoxylated alkanols and alkylphenols such as $C_8$–$C_{20}$ alkanols and alkylphenols, wherein the alkyl portion has 8 to 12 carbon atoms, the alkanols and alkylphenols containing about 1 to 10 moles of ethylene oxide per mole. Of special utility in the practice of the present invention is the sodium, potassium or ammonium sulfate derivative of the 4 mole ethylene oxide adduct of nonylphenol. Also suitable, but less preferable, are other anionic surfactants such as the sodium and potassium $C_8$–$C_{18}$ alkyl sulfates, sodium alkyl glyceryl ether sulfonates, sulfonated fatty ester salts and similar anionic surfactants wherein the solubilizing groups are —$SO_4H$ or —$SO_3H$. Other suitable anionic surfactants are the sodium, potassium or ammonium salts of fatty acids containing from about 8 to 24 carbon atoms, preferably those containing about 10 to 20 carbon atoms. The fatty acids can be obtained from natural sources such as coconut oil fatty acids, soybean oil fatty acids, tall oil fatty acids, rosin acids and hydrogenated rosin acids as well as synthetically prepared fatty acids such as by oxidation of petroleum fractions. Particular examples of such fatty acid carboxylate salts are sodium stearate, sodium oleate, sodium palmitate, potassium ricinoleate, and the like.

After the latex emulsion is prepared by admixing the components with simple agitation, such as by hand mixing, it may be subjected to more through agitation such as in a homogenizer to reduce the particle size and to more thoroughly disperse the particles. The raw emulsion is then stripped of excess water and aromatic solvent under vacuum to produce a finished latex containing about 20 to 70%, preferably about 40 to 65%., such as 60% by weight of solids, the balance consisting essentially of water.

Finished latex compositions prepared in accordance with the present invention are characterized as having excellent tensile properties. They are useful as binder for nonwoven fabrics, as adhesives, in paper coating operations, and as overdips for highly unsaturated rubber parts.

The invention is further illustrated by the following examples which are not to be considered as limitative of its scope.

EXAMPLE 1

Acetyl sulfate was prepared by adding 11.0 ml of sulfuric acid dropwise into 37.7 ml of acetic anhydride while cooling the anhydride in an ice bath. The mixture was stirred for an hour.

A butyl rubber cement was prepared by dissolving EXXON BUTYL 268 in toluene so as to prepare a 16% by weight solution. EXXON BUTYL 268 is a copolymer of isobutylene (98.5 mole %) and isoprene (1.5 mole %) having a viscosity average molecular weight of 450,000 and a Mooney Viscosity (ML 1+3 at 260° F.) of 55. To 625 grams of this cement (containing 100 grams of butyl rubber) was added 6.47 ml of the acetyl sulfate prepared above. This mixture was stirred for an hour and then 2.5 grams of propylene oxide mixed with 10 grams of toluene were added. A sample of the cement was removed, the sample was neutralized with ethylamine and then precipitated with acetone. The sample was dried in a vacuum oven overnight at 50° C. and thereafter analyzed and found to contain 0.64 wt. % sulfur.

300 grams of the sulfonated quenched cement was slowly added to 300 grams of water containing 10 grams of the sodium sulfate derivative of the 4 mol ethylene oxide adduct of nonylphenol, sold as "Alipal CO-433" (a 29.7 wt. % active surfactant). The mixture was homogenized, neutralized with 5 grams of ammonium hydroxide and excess water and toluene was stripped under vacuum using a rotary evaporator to produce a latex with 55 wt. % solids.

To evaluate the product's stability, a sample of this latex at 40% solids was sheared in a Hamilton-Beach mixer at 19,000 rpm for 30 minutes while heated at 180° F. The coagulum amounted to 0.24 wt. %.

A sample of the finished latex prepared as described above was adjusted to pH 9.5 with sodium hydroxide. A film was cast from the latex and dried overnight at room temperature. It was further dried in an oven at 170° F. for 4 hours and then vacuum dried overnight at 50° C. The film had the following tensile properties:

| | |
|---|---|
| Strength at 100% Elongation | 85 psi |
| Strength at 500% Elongation | 200 psi |
| Tensile Strength | 2700 psi |
| Elongation at Break | 1040 psi |

EXAMPLE 2

This example demonstrates the effect of various levels of propylene oxide quench on latex formation.

A series of experiments were done in which the quantity of propylene oxide was varied. In each experiment a cement containing 100 g. of butyl rubber was sulfonated with 6.5 ml (24 mmoles) of acetyl sulfate using the procedure and materials described in Example 1. The sulfonated cements were quenched with varying amounts of propylene oxide as shown in Table 1. Each quenched cement (300 g) was added to a solution of 300 g. of water containing 10 g. of "Alipal CO-433" as described in Example 1. The results are shown in Table 1.

TABLE 1

Latex Formation from Sulfonated Butyl Rubber Quenched with Varying Levels of Propylene Oxide

| Run No. | Propylene Oxide | Molar Ratio of Propylene Oxide to Acetyl Sulfate | Results |
|---|---|---|---|
| 1 | 10 phr* | 7.2 | Oil in water latex formed easily when quenched sulfonated cement mixed with water and emulsifier |
| 2 | 5 phr | 3.6 | Same as Run No. 1 |
| 3 | 2.5 phr | 1.8 | Same as Run No. 1 |
| 4 | 1.7 phr | 1.2 | Same as Run No. 1 |
| 5 | 1 phr | 0.7 | No oil in water latex formed when quenched sulfonated cement mixed with water and emulsifier. A tough mass of toluene swollen polymer formed. |
| 6 | 0 phr | 0 | Same as Run No. 5 |

*parts per hundred parts of elastomer

EXAMPLE 3

This example illustrates the use of a relatively low level of emulsifying agent. A latex was prepared by adding 300 g. of the quenched sulfonated cement of Example 1 to a solution of 4 phr of "Alipal CO-433" (6.7 g. of 29.7% active material) in 300 g. of distilled water. This is 4 parts of emulsifier per hundred parts of elastomer present in the cement solution. An oil-in-water emulsion easily formed. This emulsion was homogenized with no difficulty in an Effenback Homo-Mixer for 3 min. at 40 volts with the deflector plate up, 3 min. at 110 volts with the deflector plate up, and 5 min. at 110 volts with the deflector plate closed.

EXAMPLE 4

Acetyl sulfate was prepared by dripping 11.0 ml of sulfuric acid into 37.7 ml of acetic anhydride while cooling the acetic anhydride in an ice bath. The mixture was stirred for an hour.

An EPDM elastomer cement was prepared by dissolving an EPDM having an ethylene content of 51 wt. %, an ethylidene norbornene content of 9 wt. % and a Mooney viscosity of 50 at 260° F. in toluene. The EPDM elastomer concentration was 10 wt. %. To 1000 g. of this cement (100 g. of elastomer) was added 4.7 ml of acetyl sulfate prepared above. The cement immediately turned dark brown and was stirred for an hour. It was quenched with 2.5 g. of propylene oxide in 10 ml of toluene. The cement returned to its original amber color in about 5 min. It was stirred for an additional one half hour.

The sulfonated and quenched cement (500 g) was poured into a mixture of 500 g. of distilled water and 10.9 g. of "Alipal CO-433" (27.4% active). This is equivalent to 6 phr emulsifier per hundred parts of elastomer present in the solution. An oil-in-water emulsion formed with no difficulty. This emulsion was homogenized using an Effenback Homo-Mixer for 5 min. at 40 volts with the deflector plate up, 5 min. at 110 volts with the deflector plate up, and 5 min. at 110 volts with the deflector plate down. Sodium hydroxide (5 g. in 10 ml of water) was added. The resulting latex had an average particle size of 1μ. The latex had excellent high temperature mechanical stability with only 0.36% coagulum after shearing 30 min. in a Hamilton-Beach mixer at 19,000 rpm while being heated to 180° F.

Toluene and excess water were vacuum stripped from the emulsion using a rotary evaporator to give a latex having 36.6% solids. This latex had excellent mechanical stability giving only 0.3% coagulum when stirred at room temperature for 30 min. in a Hamilton-Beach mixer at 19,000 rpm. A film was cast from the finished latex. After drying the film had the following tensile properties:

| | |
|---|---|
| Strength at 100% Elongation | 115 psi |
| Strength at 500% Elongation | 170 psi |
| Tensile Strength | 775 psi |
| Elongation at Break | 700% |

EXAMPLE 5

This example demonstrates the use of ethylene oxide. Acetyl sulfate was prepared by dripping 11.0 ml of sulfuric acid into 37.7 ml of acetic anhydride while cooling the acetic anhydride in an ice bath. The mixture was stirred for an hour.

A butyl rubber cement was prepared by dissolving EXXON BUTYL 268 in toluene. The butyl rubber was 16 wt. %. To 625 g. of this cement (100 g. of rubber) was added 6.5 ml of acetyl sulfate prepared as described above. This mixture was stirred for one half hour. Ethylene oxide (3 ml, 2.6 g) was added to quench the sulfonation reaction. A sample was removed and neutralized with ethyl amine. The rubber was precipitated with acetone, dried in a vacuum oven and analyzed for sulfur. Results 0.7 wt. % S.

The ethylene oxide quenched cement (600 g) was mixed with 600 g. of distilled water containing 21.9 g. of "Alipal CO-433" (27.4% active) which is 6 phr emulsifier per hundred parts of elastomer present in solution. An oil-in-water emulsion easily formed. This emulsion was homogenized with an Effenback Homo-Mixer for 3 min. at 40 volts with the deflector plate up, 3 min. at 110 volts with the deflector plate up, and 5 min. at 110 volts with the deflector plate down. Ammonium hydroxide (10 g. of 28 wt. % material) was added to the emulsion. Toluene and excess water were removed with a rotary evaporator to give a latex with 52.7 wt. % solids. The latex had an average particle size of <1 micron. The latex had only 0.0002% coagulum when sheared for 30 minutes at 19,000 rpm in a Hamilton-Beach mixer.

EXAMPLE 6

This is a comparative example to demonstrate the unsuitability of higher alcohols as quenching agents for the sulfonation of low unsaturation elastomers from which a latex is subsequently prepared.

Acetyl sulfate was prepared by dripping 11.0 ml of sulfuric acid into 37.7 ml of acetic anhydride while cooling the acetic anhydride in an ice bath. The mixture was stirred for an hour.

A butyl rubber cement was prepared by dissolving EXXON BUTYL 268 in toluene. The butyl rubber was 16 wt. %. To 313 g. of the cement (50 g. of rubber) was added 3.25 ml of the acetyl sulfate prepared above. This mixture was stirred for ½ hour. 1-Octanol (31 g., b.p. 194° C.) was added and allowed to stir for ½ hr.

The sulfonated cement (345 g.) which had been quenched with 1-octanol was slowly added to a mixture of 345 g. water, 31 g. of 1-octanol and 27.4 g. of "Alipal CO433" (27.4% active). This mixture formed a raw emulsion easily. It was homogenized with an Effenback Homo-Mixer for 3 min. at 40 volts with the deflector plate up, 3 min. at 110 volts with the deflector plate up followed by 3 min. at 110 volts with the deflector plate down. Ammonium Hydroxide (5 g. of 28% solution) was added to the emulsion. Excess toluene and water were removed by stripping under vacuum with a rotary evaporator. The emulsion coagulated at about 21% solids.

What is claimed is:

1. Process for preparing a sulfonated and passivated low unsaturation elastomer cement, the elastomer being butyl rubber or EPDM, which comprises the steps of (a) providing a cement of the elastomer and a volatile solvent; (b) sulfonating the elastomer cement with an acyl sulfonating agent; and (c) passivating the sulfonated cement with at least a stoichiometric amount of an organic epoxide containing at least one reactive oxirane group.

2. The process of claim 1 wherein the epoxide has 2 to 8 carbon atoms.

3. The process of claim 2 wherein the epoxide is propylene oxide or ethylene oxide.

4. The process of claim 1 wherein the molar ratio of epoxide, based on the moles of reactive oxirane groups, to moles of sulfonating agent is from about 1:1 to 10:0.

5. The process of claim 2 wherein the weak base is ammonium hydroxide, ethylamine or tiethylamine.

6. The process of claim 1 wherein the elastomer is butyl rubber.

7. The process of claim 1 wherein the elastomer is an EPDM.

8. The process of claim 1 wherein the sulfonating agent is acetyl sulfate.

9. The product produced by the process of claim 9.

10. The product produced by the process of claim 3.

11. The product produced by the process of claim 11.

12. The prouct produced by the process of claim 6.

13. Process for preparing a sulfonated and passivated low unsaturation elastomer cement, the elastomer being butyl rubber or EPDM, which comprises the steps of (a) providing a cement of the elastomer and a volatile solvent; (b) sulfonating the elastomer cement wih an acyl sulfonating agent; (c) passivating the sulfonated cement with at least a stoichiometric amount of an organic epoxide containing at least one reactive oxirane group; and (d) neutralizing the passivated sulfonated cement with a weak base.

* * * * *